United States Patent
Chu et al.

(10) Patent No.: US 7,620,033 B2
(45) Date of Patent: Nov. 17, 2009

(54) METHOD FOR OPTIMAL PATH SELECTION IN TRAVERSAL OF PACKETS THROUGH NETWORK ADDRESS TRANSLATORS

(75) Inventors: Thomas P. Chu, Englishtown, NJ (US); Tao Jin, Beijing (CN); Francis Robert Magee, Lincroft, NJ (US); Steven H. Richman, Highland Park, NJ (US); Benjamin Y. C. Tang, Holmdel, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1037 days.

(21) Appl. No.: 10/850,977

(22) Filed: May 21, 2004

(65) Prior Publication Data
US 2005/0259637 A1    Nov. 24, 2005

(51) Int. Cl.
*H04L 12/66* (2006.01)

(52) U.S. Cl. .................. 370/352; 370/235; 370/250; 370/388; 370/401; 701/213; 707/10; 709/227; 709/252; 711/110; 714/4

(58) Field of Classification Search ............. 370/232, 370/242, 352, 215.01, 389, 235, 250, 388, 370/401; 726/11; 709/227, 245, 252; 701/213; 707/10; 711/110; 714/4
See application file for complete search history.

(56) References Cited

U.S. PATENT DOCUMENTS 6,262,974 B1 * 7/2001 Chevalier et al. ............ 370/232
6,553,310 B1 * 4/2003 Lopke ........................ 701/213
6,574,216 B1 * 6/2003 Farris et al. ................. 370/352

(Continued)

OTHER PUBLICATIONS

"White Paper—SIP, Security and Session Controllers" Newport Networks, www.newport-networks.com/whitepapers/security1.html, printed May 3, 2004.

(Continued)

*Primary Examiner*—Gerald Gauthier
(74) *Attorney, Agent, or Firm*—Wall & Tong, LLP

(57) ABSTRACT

Reduction of administrative overhead in maintaining network information, rapid convergence on an optimal routing path through the data network, and utilization of only required network resources are realized by a novel method for establishing a call path between network users. The method is based upon deployment of a network information server that stores network topology information and that is addressable by each end user. In this method, the network information server receives a request to establish a call path. The request identifies at least the calling party. In response to the request, the network information server determines a network traversal between the calling party and a root network wherein the network traversal includes call path information about the sub-networks between the calling party and the root network. The request for establishing a call path can also identify the called party. Based on the calling and called party identification, the network information server also determines a second network traversal between the called party and the root network. The second network traversal is sent to either the calling party or the called party or to both the calling and called parties. The server can determine an intersection of the traversals and send the intersection information to the parties. The intersection information is known as a merge point and represents an optimal call path between the parties.

22 Claims, 8 Drawing Sheets

U.S. PATENT DOCUMENTS

| | | | |
|---|---|---|---|
| 6,578,105 B2 * | 6/2003 | Finn et al. | 711/110 |
| 6,636,508 B1 * | 10/2003 | Li et al. | 370/389 |
| 6,735,173 B1 * | 5/2004 | Lenoski et al. | 370/235 |
| 6,781,959 B1 * | 8/2004 | Garakani et al. | 370/242 |
| 6,865,155 B1 * | 3/2005 | Wong et al. | 370/235 |
| 6,920,135 B1 * | 7/2005 | Lea | 370/389 |
| 6,973,032 B1 * | 12/2005 | Casley et al. | 370/230 |
| 6,977,920 B1 * | 12/2005 | Kim | 370/352 |
| 6,980,556 B2 * | 12/2005 | Vimpari | 370/395.52 |
| 7,058,010 B2 * | 6/2006 | Chidambaran et al. | 370/218 |
| 7,237,138 B2 * | 6/2007 | Greenwald et al. | 714/4 |
| 7,260,205 B1 * | 8/2007 | Murphy et al. | 379/215.01 |
| 7,260,636 B2 * | 8/2007 | Blumenau et al. | 709/227 |
| 7,283,477 B1 * | 10/2007 | Fedyk et al. | 370/237 |
| 7,302,496 B1 * | 11/2007 | Metzger | 709/245 |
| 7,310,688 B1 * | 12/2007 | Chin | 709/252 |
| 7,328,280 B2 * | 2/2008 | Takeda et al. | 709/245 |
| 7,346,056 B2 * | 3/2008 | Devi | 370/392 |
| 7,352,703 B2 * | 4/2008 | Elie-Dit-Cosaque et al. | 370/237 |
| 2003/0033307 A1 * | 2/2003 | Davis et al. | 707/10 |
| 2003/0233457 A1 * | 12/2003 | Basilier et al. | 709/227 |
| 2004/0095927 A1 * | 5/2004 | Chang et al. | 370/388 |
| 2004/0128554 A1 * | 7/2004 | Maher et al. | 713/201 |
| 2004/0151177 A1 * | 8/2004 | Burton et al. | 370/389 |
| 2004/0213151 A1 * | 10/2004 | Willhite et al. | 370/229 |
| 2004/0258066 A1 * | 12/2004 | Chen et al. | 370/390 |
| 2005/0018833 A1 * | 1/2005 | Wang et al. | 379/215.01 |
| 2005/0053009 A1 * | 3/2005 | Denby et al. | 370/250 |
| 2005/0068961 A1 * | 3/2005 | Raghunath et al. | 370/395.2 |
| 2005/0100001 A1 * | 5/2005 | Liu | 370/352 |
| 2005/0201370 A1 * | 9/2005 | Poyhonen et al. | 370/389 |
| 2005/0259665 A1 * | 11/2005 | Norden | 370/396 |
| 2005/0265228 A1 * | 12/2005 | Fredette et al. | 370/216 |
| 2006/0056328 A1 * | 3/2006 | Lehane et al. | 370/315 |
| 2007/0140267 A1 * | 6/2007 | Yang | 370/401 |

OTHER PUBLICATIONS

"NAT Traversal for Multimedia over IP Services—White Paper", Newport Networks, www.newport-networks.com/whitepapers/nat-traversal.html, printed May 3, 2004.

* cited by examiner

METHOD FOR OPTIMAL PATH SELECTION IN TRAVERSAL OF PACKETS THROUGH NETWORK ADDRESS TRANSLATORS

BACKGROUND OF THE INVENTION

1. Field of the Invention

This invention relates to a method for selecting an optimal path for packets through a data network including network address translators.

2. Description of the Related Art

Data networks, such as IP networks, provide an avenue for multimedia communication between end-points such as computer stations and IP phones. These networks even allow telephone calls to be handled between end-users using techniques such as Voice over IP (VoIP) and the like.

Data networks generally include private networks and public networks, arranged hierarchically. The private networks usually involve individual computer users and local area networks while the public networks are generally owned by service providers and may interconnect over more extensive areas. In order to manage the limited number of addresses available to private networks and to maintain security on the data networks, a firewall and a network address translation (NAT) device are typically installed at the interface between two separate networks. Although a NAT device provides a level of security to the network users it serves and even though it can dynamically allocate the limited number of public addresses that it has at its disposal for all the network users, a NAT device nonetheless increases the difficulty with which calls can be made from one party to another. This difficulty occurs because any NAT device in the data path of the bearer channel alters the address of the packets thereby complicating call dynamics.

This difficulty is manifested in a number of different ways. First, most media traffic, such a voice, video, and the like, is carried in user datagram packets (UDP). UDP is a simple, flexible protocol well suited to real time traffic from multimedia applications. UDP packets pose a high security risk because they cannot be easily traced. It is normal policy for firewalls and NAT devices to block all incoming UDP packets. NAT devices require an outgoing packet from an internal device to be sent to an external host before the NAT device will accept UDP packets from that host back to the internal device. In this way, unsolicited UDP packets are effectively blocked.

Each device in a network can have its own private IP address. A NAT device translates private IP addresses and port numbers within the private network into public internet (IP) addresses when the communication passes between private and public networks or passes between networks within a common network that use different addressing spaces. This translation allows a limited number of public IP addresses to serve the needs of private network subscribers including very large corporations as well as service providers with limited IP address space. As data such as a media stream or the like is sent from the private network to the public network and vice versa, the user device within the private network is dynamically assigned a specific address and port number in the public address space by the NAT device. Each NAT device maintains a binding table that links private addresses and port numbers with public addresses and port numbers. But as stated earlier, these bindings are only initiated by outgoing traffic from the private network subscribers. There is no mechanism for the NAT device to create a binding table entry for incoming traffic. This is a particular problem for IP telephony applications where the IP phone is expected to receive packets such as network announcements, ringback tones, and the like before sending packets out.

These problems are exacerbated by the requirements of messaging protocols. For example, end-to-end Session Initiation Protocol (SIP) messaging between end-users contains details of the private network addresses and ports designated by the end-users for traffic flow. When end-users attempt to use these private addresses for communication, the connection fails because the network does not know how to forward the packets to the private addresses. This issue also applies to other signaling protocols such as H.323 and Media Gateway Control Protocol (MGCP), to name a few.

Several approaches have been proposed for dealing with the problem presented by NAT traversal. These approaches include Universal Plug and Play (UPnP), Simple Traversal of UDP through Network Address Translation Devices (STUN), Traversal Using Relay NAT (TURN), Application Layer Gateway (ALG), manual configuration techniques, and tunneling or pin-holing techniques. Some of these techniques such as STUN and TURN require the use of additional equipment such as servers and establishment of a client-server relationship with network users. Some of these techniques require labor intensive involvement of a system administrator to make the necessary connections. Others present potential security risks. None regularly provide an optimal path through the network, at least not without considerable effort.

One other technique being proposed in a standards setting organization (IETF) is known as Interactive Connectivity Establishment or ICE. It allows user datagram (UDP) packets of peer-to-peer applications to traverse NAT devices and firewalls for multimedia session signaling protocols such as SIP. The technique relies on the use of STUN and TURN servers together with the mutual cooperation of the users in a session. In this technique and through an ICE client routine, the calling client will consult its network database to locate the network traversal to a default TURN server. The called client initiates the same activity. The database and the traversal data therein are manually loaded and must be updated by each client to remain correct as the network changes from day to day. The traversal represents a default path through the network that is generally non-optimal but is guaranteed to provide the necessary connectivity. Regardless of the optimality of the default path, the ICE procedure reserves resources, such as TURN servers throughout the network along the traversal, to the call until such time as they are released. According to ICE, the clients will then initiate an exhaustive search by trial and error for an optimal (highest priority) network call path connecting the clients together. This technique is time consuming, utilizes important network resources, and requires a significant amount of administrative overhead to maintain the distributed databases at each client computer.

SUMMARY OF THE INVENTION

Reduction of administrative overhead in maintaining network information, rapid convergence on an optimal routing path through the data network, and utilization of only required network resources are realized by a novel method for establishing a call path between network users. One embodiment of the method employs a network information server that stores network topology information and that is addressable by each end user. In this method, the network information server receives a request to establish a call path. The request identifies at least the calling party. In response to the request and in accordance with the principles of the invention, the network information server determines a network traversal between the calling party and a root network, wherein the network traversal includes call path information about the sub-networks between the calling party and the root network. The root network is a network common to both the calling and called parties at or near the top of the network hierarchy, for example, a national backbone network.

In another embodiment of the invention, the request for establishing a call path also identifies the called party. In addition to determining the first network traversal, the network information server also determines a second network traversal between the called party and the root network. The second network traversal is sent to either the calling party and/or the called party.

In another embodiment of this invention, the network information server determines the first and second network traversals and a merge point between these traversals when the calling and called parties are both identified in the call path establishment request. The server then sends the merge point alone or the merge point together with a related traversal to each respective party.

In accordance with another aspect of the present invention, a request is transmitted to the server to establish a call path. The request includes identification information about the calling party and possibly the called party. The calling party then receives the first network traversal and proceeds to contact a call server identified in the traversal. If the called party is identified in the request, then the calling party may also receive the second network traversal and the merge point. The calling party forwards the second network traversal and the merge point to the called party. When the merge point has been received, the calling and called parties contact the call server identified at the merge point in the network. In the event that the establishment of a call path fails by using the merge point, then the calling party utilizes the first network traversal to contact a call server identified in the root network.

BRIEF DESCRIPTION OF THE DRAWINGS

In the drawings.

It should be noted that, where possible, identical reference numerals have been inserted in the figures to denote identical elements.

DETAILED DESCRIPTION

Figure 1:
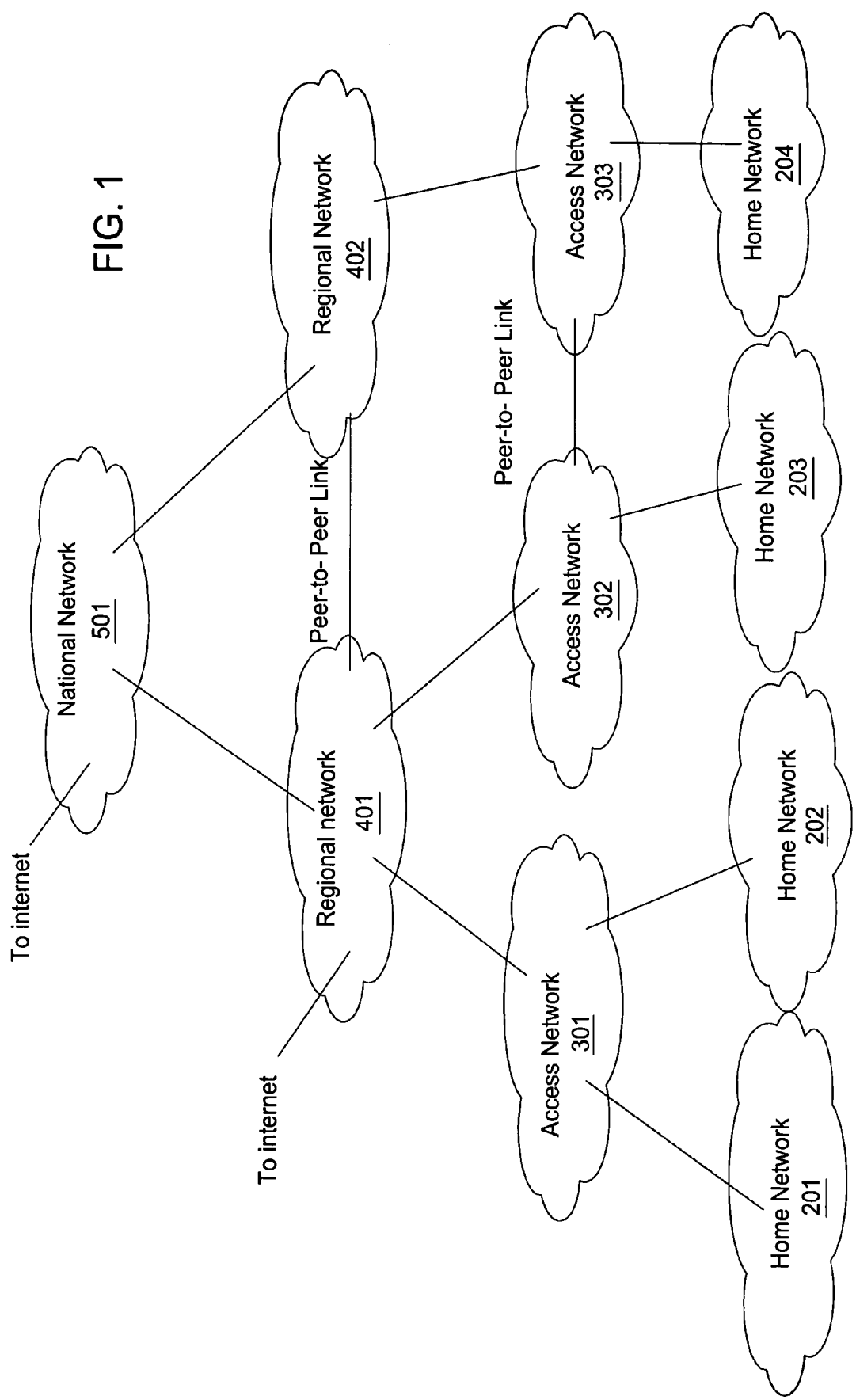
FIG. 1 shows a simplified diagram of a multilayered network architecture.
Figure 2:
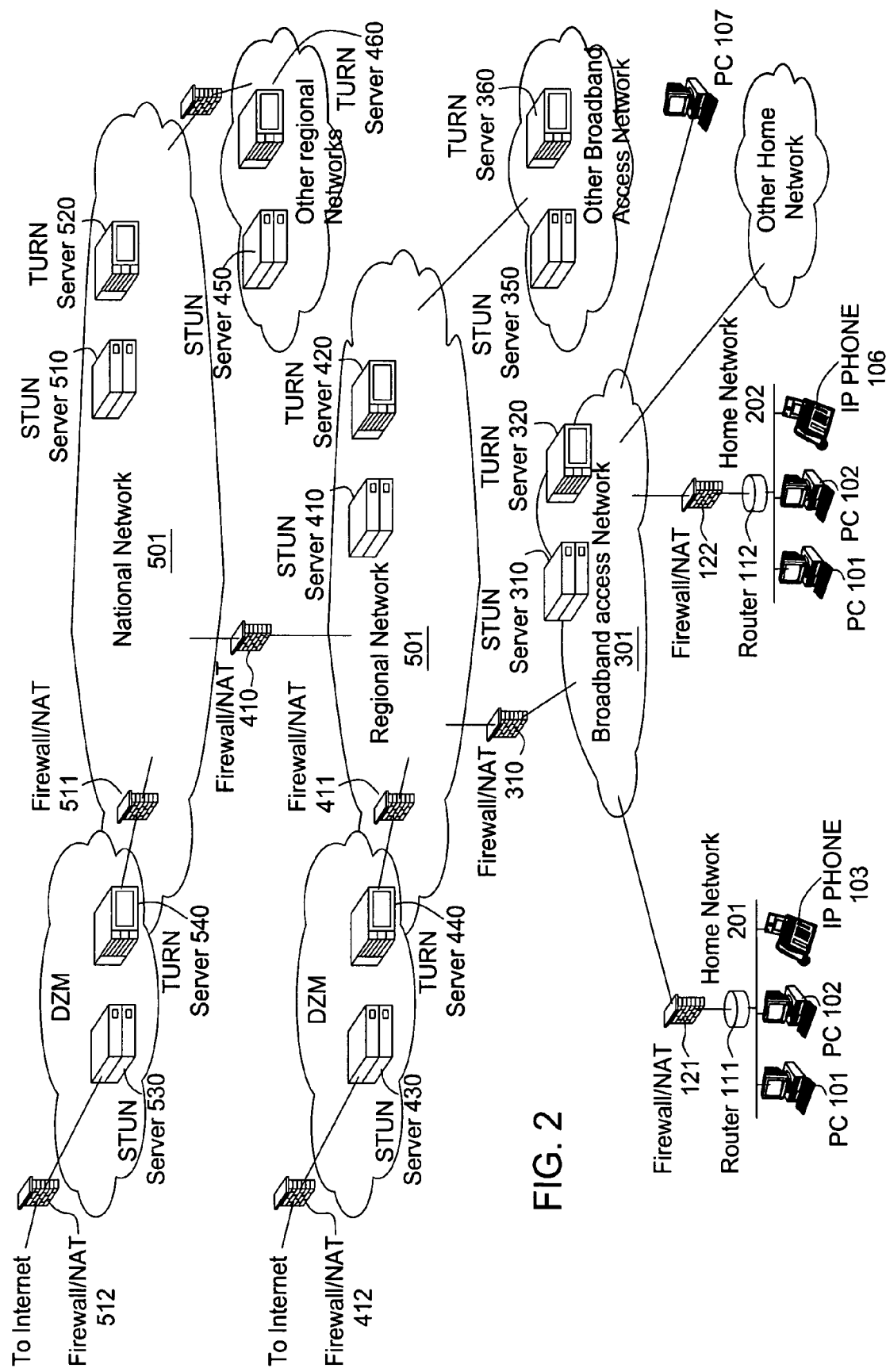
FIG. 2 shows a more detailed view of the network depicted in FIG. 1.

FIGS. 1 and 2 show an exemplary network architecture in a broadband access application. FIG. 1 shows a simplified diagram of the networks and their interconnection. FIG. 2 shows a more detailed presentation of network elements and features within a portion of the network shown in FIG. 1. The network elements and features will be utilized throughout this description.

In this network architecture, subscribers are consumers connected to one or more service providers through high speed access devices such as cable modems, DSL, and the like. Subscribers are also referred to as clients or users or end points. Service providers provide services on a network such as internet access, voice over IP, and video on demand. Service providers include companies such as AOL, AT&T, and Verizon.

A subscriber belongs to a home network such as home networks 201 through 204. The home networks are then connected through access networks 301 through 303 to regional networks in this hierarchical approach. Ultimately, the regional networks are connected to a national network 501 sometimes referred to as a backbone network. All the above networks, access, regional and backbone, can be owned and managed by the same service provider or different service providers.

Firewalls and network address translation devices (NAT devices) may be included in the links between network layers. These devices provide increased security, but they also assist in managing a limited number of public IP addresses given to a service provider for the access and regional networks. Firewalls and NAT devices may be present between different layers of networks even though the networks are managed by the same service provider.

NAT devices and firewalls naturally define a hierarchy between the layers of networks. If a NAT translates the addresses from network C to addresses of another network D, it is understood that network C is a child of network D. That is, network C is subordinate in the hierarchy to network D. The presence of NAT device 121 on the link between home network 201 and access network 301 causes home network 201 to be considered as a child of access network 310. Similarly, the presence of NAT device 122 between home network 202 and access network 301 causes home network 202 to be considered as a child of access network 301. As the rest of the hierarchy is viewed, it is apparent that access network 301 is a child of regional network 401 which, in turn, is a child of national network 501.

Although NAT devices and firewalls define a hierarchy, peer-to-peer communications can exists between two networks in the same layer of the hierarchy. This occurs when there is a pair of firewalls rather than NAT devices between the two networks. One firewall protects one network while the other firewall protects the other. Two such peer-to-peer communication links exist between regional networks 401 and 402 and between access networks 302 and 303.

As shown in more detail in FIG. 2, individual subscribers are connected to broadband access network 301 directly and indirectly. Some individual subscribers connect directly to network 301. Other subscribers connect indirectly through their home network to network 301.

Home networks 201 and 202 are typically configured as simple local area networks. Network 201 is for example, a local area network at home connecting personal computers 101 and 102 and other devices such as IP phone 103. Network 201 also includes router 111 and firewall/NAT device 121 to connect to broadband access network 301. For simplicity, physical layer devices such as cable modems are not shown. Routers are the basic devices used for forwarding packets outside a network. Although not shown in the depictions of the other networks in FIG. 2, routers are understood to be deployed therein. In an example from experimental practice, firewall/NAT device 121 is on the subscriber premises. The operation of this firewall/NAT device is controlled by the subscriber as opposed to the service provider. Typically, when a firewall is integrated within router 111, it provides both firewall as well as NAT device functions since home LANs tend to use private IP addressing.

Firewall/NAT devices are depicted as being deployed in the connecting links between the various network layers. For example, firewall/NAT device 310 is situated on the link between access network 301 and regional network 401. As mentioned above, this firewall/NAT device can be present even if access network 301 and regional network 401 are managed by the same service provider.

In a similar fashion, regional networks are connected to a backbone network usually through some type of firewall/NAT device. Firewall/NAT device 410 is shown as being deployed between these networks. Gateway to the Internet is provided through DMZs at the regional network level and the backbone network level. Firewall/NAT devices 411, 412, 511, and 512 are shown as being deployed between the Internet and the DMZ, as well as between the DMZ and the network. If the traffic warrants such a gateway, it could also be deployed at the access network level.

As shown in FIG. 2, there are STUN and TURN servers at each network layer above the home network layer. These servers are used by the ICE procedure to determine an optimal path through the network for UDP packets when NAT devices are present. The operation of the STUN and TURN servers and the ICE procedure will be described in more detail below.

A key feature of this invention is the traversal of a client. The traversal is the set of addresses to servers in the series of networks between the client and the root network, which is the national backbone network in FIGS. 1 and 2. As a convention, the network to which the client belongs is not considered part of the traversal. The traversal will be discussed in more detail below.

There are many possible paths through the entire network that connect one party to the other. Not all paths that can be defined in the network are optimal, in terms of shortest path and fewest number of allocated resources. The path that is optimal goes through a point in the network known as a merge point. The merge point of a client and its peer is the first intersection of the traversal between the client and the root sub-network, and the traversal between the peer and the root sub-network. In reference to FIG. 1, if the client is in home network 201 and the peer is in home network 203, then the merge point between the client and the peer would then be sub-network 401. In determining the merge point, peer-to-peer links or tunnels between two sub-networks act as a bridge between the two sub-networks. For example, when the client is in network 201 and the peer is in network 204, the merge point between the client and the peer is the network pair 401 and 402, because of the peer-to-peer link is connecting them. The merge point of the client would be the network closest to it (network 401 for the client in network 201) and the merge point for the peer would be the network closest to it (network 402 for the peer in network 204).

It was noted earlier that the NAT devices such as NAT devices 121, 122, 310, 410, 411, 412, 511, and 512 shown in FIG. 2 provide some level of security, but also introduce added complexity into multimedia communications between end-users, especially when UDP packets are employed. The levels of security and complexity can be understood by viewing four major types of NAT devices identified by the IETF for UDP packets. The four types are: Full Cone NAT device, Restricted Cone NAT device, Restricted Port Cone NAT device, and Symmetric NAT device. Full cone provides the least amount of security while symmetric provides the greatest amount of security. These types will be described below in more detail.

An internal host attempts to communicate through a NAT device to an external host. The internal host has an IP address A1 and accesses port P1 at the NAT device. The external host has an IP address B1. The NAT device is situated between the internal network and the external network. Initially as a security measure, the NAT device does not accept any UDP packets from any external host. Dynamic selective packet filtering begins when the internal host sends a UDP packet to the external host. On the receipt of the outbound packet from the internal host, the NAT device selects an available public address/port ID number, X1/Q1, from its allocated external address space to represent the internal address/port ID number, A1/P1, of the internal host. The NAT device creates an entry in the translation table indicating that it should translate an address/port ID number from A1/P1 to X1/Q1 in the origination address fields for out-bound packets and vice versa, from X1/Q1 to A1/P1, in the destination address field for inbound packet. For full cone NAT device operation, the NAT device will now accept packets from any external host as long as the packets are sent to X1/Q1, the address/port ID representing the internal host. Even though the internal host has only communicated with one external host, the NAT device operating in full cone mode will accept inbound packets from any external host provided they are addressed to the correct address/port ID number that was used with the first external host.

Restricted cone NAT devices operate in a similar manner to full cone NAT devices in setting up the communication. But inbound packets are only accepted from external hosts that have been in communication with the internal host. The internal host sends UDP packets to two different external hosts using port P1. The restricted cone NAT device translates the internal address/port ID from A1/P1 to X1/Q1. In addition, the NAT device recognizes the addresses of the two external hosts. Inbound UDP packets from these two external hosts bearing the correct address/port ID (X1/Q1) are accepted and allowed to traverse the NAT device. Any packet from other external hosts, not the two original external hosts, are blocked by the restricted cone NAT device in spite of the fact that they bear the correct address/port ID (X1/Q1) for the internal host. Port numbers for the external hosts are not considered by the NAT device in this mode. That is, the original external hosts can continually change port numbers without losing the capability to send UDP packet to the internal host.

A restricted port cone NAT device is similar to the restricted cone NAT device. But it adds more security by considering the port number of the external host in determining whether an inbound UDP packet can reach the internal host. If the original external host changes its port connection to communicate back with the internal host, then the inbound packets will be blocked by the restricted port cone NAT device. The blockage occurs because the external host IP address/port ID no longer matches the address/port ID to which the outbound packets were sent by the internal host.

A symmetric NAT device is the most restrictive NAT device of all four types. Every flow will have its own binding and translated address. For example, if internal host at address/port ID A1/P1 sends separate data to an external host at address/port IDs B1/P2 and B1/P3, then this is considered to be two data flows. For the flow between the internal host at A1/P1 and the external host at B1/P2, the symmetric NAT device translates A1/P1 to X1/Q2; for the flow between the internal host at A1/P1 and the external host at B2/P3, the symmetric NAT device will translate A1/P1 to X2/Q3. Therefore, the internal host address/port ID, A1/P1, is translated to different addresses/ports by the NAT device for each flow. No external host packets using the various address/port IDs can traverse the NAT device unless those packets originate from the correct external host ID.

From the description above, it is understood that the full cone NAT device offers greater flexibility with less security, while the symmetric NAT device offers greater security with reduced flexibility. Obviously, the symmetric NAT device manages far larger dynamic translation tables than its full cone counterpart. Full cone NAT devices are preferred for operation between internal networks, whereas symmetric NAT devices are preferred between internal and external networks. It should be understood by persons skilled in the art that the NAT devices shown in the FIGs. can be of any of the types described above.

As mentioned above, Simple Traversal of UDP through Network Address Translation Devices (STUN) and Traversal Using Relay NAT (TURN) protocols have been proposed for simplifying UDP packet communication for inbound packets to a NAT device. Both protocols have developed client-server architectures. Accordingly, they are logical modules implemented generally in software and resident on any equipment as needed such as a separate server. STUN and TURN servers are depicted in FIG. 2 at various layers within the network architecture. Each protocol will be discussed in detail below.

The STUN protocol has been developed to detect firewalls and NAT devices disposed between the STUN client and the STUN server. Since there can be multiple NATs in between the client and server, the protocol will detect the aggregate behavior of the intervening NAT devices.

Two request messages are generated in the STUN protocol from the client to the server. The first request message is the Shared Secure Request. This message is transported over TCP using transport layer security. The function of this request is for the client to obtain a temporary user-ID and password to be used in subsequent Binding Requests and Responses between the client and the server. With the temporary user-id and password, it is possible to authenticate these messages and detect any tampering with the messages.

The Binding Request is the second request message in the STUN protocol. It is used to detect the presence and type of NAT device between the STUN client and STUN server. The request and response of the binding request are realized as UDP packets. The request message also contains a number of flags which instruct the server how to respond.

In a STUN binding request, the STUN client (e.g., an end user) with IP address/port number A1/P1 sends a binding request to the primary IP address and the primary port address of the STUN server B1/P2. The request packet traverses a number of firewall/NAT devices and arrives at the server. The last firewall/NAT device translates the address of the STUN client in the source address field. If the flags of the request are not set, the STUN server responds by inserting the source address of the incoming request packets into a specific field of the reply known as the Mapped Address field. The source address inserted by the STUN server is, in fact, the address that resulted from the last translation by the firewall/NAT device preceding the STUN server. From the value encoded in the mapped address field, the client learns its translated address as seen by the STUN server. Since the client has already sent a UDP packet via the request to the STUN server, any of the four NAT device types described above allow the response from the server back to the client.

Using flags in the request message, a client can send a request to the primary host/port address, but instruct the STUN server to respond using the secondary host/port addresses. In this case, the response may or may not be received by the client depending upon the type of NAT devices between the client and the server. The response can pass through a full cone NAT device because the internal host/port has already sent out a UDP packet to the server. But the response will be blocked by all the other NAT device types. In this way, by sending requests to the primary and secondary host/port addresses and by instructing the server which address to use to respond, a STUN client can discover the types of NAT devices between the client and the server. For example, a client can discover that there is no firewall or NAT device in the path, or that there is a firewall that blocks all UDP packets in the path, or that there is a full cone NAT device, and so on. The detail of the logic is presented in RFC 3489 from the IETF and will not be repeated here, although RFC 3489 is expressly incorporated herein by reference.

In many peer-to-peer applications such as telephony, when an end-point initiates a call, the forward channel from the calling party to the called party is disabled until the called party responds by, for example, picking up the phone. This is because the service provider does not want to transport any data until billing actually starts. But during call set up, the backward channel from the called party to the calling party is open. This is to allow the passage of tones and announcements from the network to the caller. When NAT devices are present between the calling and called parties, inbound packets on the backward channel are usually blocked. With all four types of NAT devices described above, binding is activated by the internal host sending a UDP packet to its peer first. Most NAT devices do not activate binding based on external incoming packets such as on the backward channel discussed above.

The TURN protocol has been proposed to solve this problem. TURN utilizes a client-server architecture. In the TURN protocol, a client with address X1/P1 can request the TURN server to allocate one of its host/port addresses, Y1/Q1, to the client. The client can then notify its peer, Z1/R1, to send all bearer packets to the allocated address Y1/Q1 on the TURN server. Based on the first UDP packet sent to the allocated address, the TURN server forms a binding between the source address of the incoming packet, Z1/R1, to the allocated address at the TURN server, Y1/Q1. The TURN server then forwards all packets sent from peer Z1/R1 to the allocated address Y1/Q1 on to the client at X1/P1. Conceptually, the TURN server behaves like a symmetric NAT device in reverse. That is, the TURN server causes the binding to be activated by an incoming UDP packet instead of an outgoing packet.

At the protocol level, TURN messages follow much the same structure as STUN. The TURN protocol even uses the same shared secret messages for the transfer of the temporary user ID and password. The TURN protocol adds three additional messages: Allocate Request, Allocate Response, and Allocate Error Respond and a number of additional fields. In the TURN protocol, the TURN server can have interfaces to multiple networks and can allocate multiple addresses to a client, if required. Unused addresses allocated by the server to a client can be de-allocated at the client's request or at the end of a particular time period. It is understood by those persons skilled in the art that the TURN protocol specification is currently under revision as an internet-draft.

From the descriptions above, one can see that the TURN protocol is similar to the STUN protocol. But operationally, a TURN server requires much more resource than a STUN server. A STUN server just responds to queries from STUN clients without creating bindings or translation table. On the other hand, a TURN server must create bindings and translation tables, translate addresses of the incoming UDP packets, and relay UDP packets between end-points. But, it should be noted that the address obtained from a TURN server has a much better likelihood of establishing a call path than one learned from a STUN server.

Interactive Connectivity Establishment (ICE) is a methodology proposed for NAT device traversal using multimedia session establishment protocols. Presently, ICE is a proposal in the IETF to allow UDP packets of peer-to-peer applications to traverse NAT and firewall devices. The IETF Internet draft of the ICE procedure is expressly incorporated herein by reference in its entirety. The ICE procedure builds on both the STUN and TURN protocols. In one embodiment, the signaling protocol is Session Initiation Protocol (SIP), although the same procedures can be applied to other signaling protocols as long as the protocol can support mid-call modification. In support of mid-call modifications, a protocol can modify the characteristics of a call in the middle of the call. One exemplary modification includes instructing the end-points to send packets to another address, for example, switching from one call server to another. The structure of ICE is described in detail below.

In the ICE environment, each end-point or end user supports SIP and both the STUN client and STUN server. Since the STUN protocol is a simple query protocol, adding STUN at the end-points is relatively simple. Since each end-point includes a STUN server, an end-point can send STUN request to any peer and discover the existence of any NAT device and the type of NAT device between the end-point and its peer. The end-point also obtains its translated IP address as known to its peer. In addition, ICE requires that a STUN server and a TURN server be deployed in all networks with the exception of the home networks. The ICE environment is clearly depicted in FIG. 2.

With reference to FIG. 2, it is understood that, because of the NAT devices and the presence of TURN servers in the network, there could be multiple ways for an end-point to send packets to its peer. The objective of ICE is to find all these possible paths and determine an optimal path on which the communication can take place. It is desirable to use the shortest path through the network and also minimize the use of TURN servers because of their resource demanding nature.

In order to understand the multiple path possibilities through the network of FIG. 2, one can consider the example where PC 101 in home network 201 wants to send a packet to PC 104 in home network 202. The following methods and paths are possible:

PC 104 reserves an address at TURN server 510 of nationwide network 501. PC 104 informs PC 101 of this allocated address. PC 101 sends packets to that address; or PC 104 reserves an address at TURN server 410 (or TURN server 310). PC 104 informs PC 101 of this allocated address. PC 101 then sends packets to that address; or Assuming firewall/NAT 122 is a full cone NAT device, PC 104 sends a STUN request to STUN server 310. Through the response from the STUN server, PC 104 learns of its translated host/port address at NAT 122. PC 104 informs PC 101 of this translated address. PC 101 then sends packets to that particular translated address. The packets will pass through NAT 122 because it is full cone NAT device and because PC 104 has already communicated out through the full cone NAT to learn its translated address.

The ICE protocol is best illustrated and understood by an example, which follows. Consider the example described above in which PC 101 wants to establish a call with PC 104. A considerable requirement in ICE is that the originator of that call, PC 101, knows a priori an address that it is guaranteed for its peer, PC 104, at which to send bearer packets. This requirement is realized by storing detailed network information in each and every end-point of the network—this can involve hundreds or even thousands of end-point devices such as PCs and IP phones. Since there is no automated way for this information to be acquired and stored, it must be set up manually by a system administrator in each end-point device. This is a time-consuming and error-prone task that requires frequent updates as the network changes.

Before sending the INVITE message (the call set up message in SIP) to PC 104, PC 101 gathers a number of candidate addresses that PC 104 use more efficiently than the default address. This is done by first sending STUN requests from PC 101 to STUN servers 310, 410, and 510 in order to learn how its translated address is viewed by the servers. In this example, STUN servers 310, 410, and 510 return addresses A3, A4, and A5, respectively. PC 101 also sends allocation requests to TURN servers 320, 420 and 520 and, as a result, is allocated addresses A31, A41, and A51 by the respective TURN servers. Allocated address A51 is guaranteed to work on any on-net call because TURN server 520 is at the highest level of the network hierarchy. This address then becomes the default address for communications. Thus, when PC 101 in sends its INVITE message to PC 104, PC 101 will:

Specify that PC 104 send its bearer packets initially to the default address A51;

Include in the Session Description Protocol (SDP) object within the INVITE message, a list of candidate addresses that may provide more efficient connectivity. The list of addresses may include a) the local address A for PC 101, b) the addresses obtained from the STUN servers, A3, A4, and A5, and c) the addresses allocated by the remaining TURN servers, A31, and A41 since address A51 from TURN server 520 is used as default address.

Addresses are set in a priority order. According to the ICE protocol, it has been suggested that the local address has the highest priority and all address learned from STUN servers should have higher priority than those addresses allocated by TURN servers. This priority ordering is based on the fact that TURN servers use more network resources than STUN servers. For the present example, the address priority in descending order is as follows: A, A3, A4, A5, A31, and A41.

When PC 104 receives the INVITE message from PC 101, that is, endpoint address A, it discovers some of addresses that its peer, PC 101, may use to send bearer packets. The procedure is similar to the procedure described above for PC 101. PC 104 proceeds by sending requests to the STUN and TURN servers. For this example, the discovered addresses are similar to those discovered and listed above for PC 101, namely, addresses B3, B4, B5, B31, B41, and B51. It is understood that the local address for PC 104 is B.

Either concurrent with the step described immediately above or subsequent to that step, PC 104 sends STUN requests to all the addresses provided by PC 101 in the SDP. In the example, those addresses were address A, A3, A4, A5, A31, and A41. If NAT device 121 is a symmetric NAT, then the STUN request to addresses A, A3, A5, and A5 will be blocked by the NAT and, therefore, will result in no response back to PC 104. But, STUN requests to addresses A31, A41, and A51 (the default address) will result in responses. Within the response is the translated address for B (PC 104) as viewed by A (PC 101).

In this example, B31A is the translated address for PC 104 when PC 104 is transmitting to address A31. Similarly, B41A and B51A are the translated addresses for PC 104 when PC 104 is transmitting to addressed A41 and A51, respectively. The new translated addresses, B31A and B41A, are referred to as peer derived addresses. The priority of address B31A is the same as the priority of address A31; the priority of address B41A is the same as the priority of address A41; and the priority of address B51A is the same as the priority of address A51. If the priority of two addresses is the same, the ICE protocol determines that a peer-derived address takes precedence over an address that is self-discovered. In the example, peer-derived address B31A has a higher priority than self-discovered address B31.

At this point in the protocol, PC 104 knows that it can send data to B31, B41, and B51 (the default). Since B31 has highest priority, PC 104 starts sending data to this address. PC 101 also knows this because it received a STUN request from PC 104 at these addresses. PC 104 also has discovered a number of addresses on its own from STUN and TURN servers and by sending STUN request to the addresses forwarded by PC 101. PC 104 sends all these addresses with their priority order to PC 101 within a SIP message. The addresses, in descending order of priority are as follows: B3, B4, B5, B31A, B31, B41A, B4, and B51A. Address B51 allocated from TURN server 520 is the default address.

Once PC 101 receives the address lists from PC 104, PC 101 sends STUN probes to the addresses provided the PC 104. If NAT 122 is a symmetric NAT, then NAT 122 will block the requests to addresses B3, B4, and B5. The requests to addresses B31, B41, B51, B31A, B41A, and B51A all traverse the NAT and generate a response. At this point, however, no new addresses are learned by PC 101. The addresses with highest priority are addresses B31 and B31A. Since address B31A is a peer-derived address, it takes precedence and is selected for transmission.

Without new addresses to investigate, the ICE protocol ceases investigation. PC 101 sends its bearer data to address B31A and PC 104 sends its bearer packet to address A31. Viewed within the network of FIG. 2, the call path is set up between PC 101 and PC 104 going through TURN server 310 and using the address allocated to PC101.

If the investigation cycle had uncovered additional new addresses, then the calling party (PC 101) would send the new address or addresses back to the call destination (PC 104) and repeat the investigation cycles through the STUN servers until no new address is found.

From the description above, it should be apparent that the ICE protocol allows an end-point to determine as much as possible about addresses that its peer can use to send UDP packets to it. This is accomplished by:

Sending STUN request to STUN servers;
Requesting address allocation from TURN servers; and
Sending STUN requests to addresses provided by the peer.

The end-point sends all the discovered addresses to its peer. In turn, the peer tests connectivity by sending STUN requests to all the addresses received from the end-point. The addresses are then ranked by priority and the address with highest priority will then be selected for use. Although the ICE protocol relies heavily on STUN and TURN protocols, it can support other address allocation mechanism such as Realm Specific IP (RSIP).

Although the ICE protocol is still under development in the IETF, it places a tremendous burden on network resources. In establishing connectivity with its peer, an end-point is required to know a default address that guarantees connectivity. This default address may change based on network reconfiguration or based on the address of the peer. Addresses of all the STUN servers and TURN servers are required to be known to and resident at each end-point via some means. One possible technique for each end point to have this address information available is by manual configuration in a local database at each end-point. When there is any change in the server addresses, each end point would require a manual update, which is labor extensive. Also, priority of STUN and TURN server addresses are required to be known to each end-point. Priority of the same server is determined relative to each end point. That is, priority of a server depends on the particular end point that is viewing the server. But the ICE protocol requires that the priority information be resident at each end point in a database, for example. This priority information must then be manually configured at each of the end-points. Again, any change in network configuration necessitates more manual changes at all the end-points, a process that is labor intensive. Finally, the process dictated by the Ice protocol for finding an optimal call path through the network is by trial and error and time consuming.

The present invention eliminates many of the deficiencies mentioned above for the ICE protocol and insures that an optimal call path can be identified and set up rapidly in the network by deploying a new network information server within the network that maintains a collection of network topology information for that network. The new network information server, which is called and ICE_INFO server, is known to and addressable by all the end points in the network. A client-server architecture is utilized with the ICE_INFO server. It responds to information requests by a calling party by providing traversal and merge, point information. The calling party can then use this information to set up the call to a called party over an optimal call path possibly including NAT and firewall devices without having to search the network servers on a trial and error basis. Moreover, by collecting the network topology information in a new server, manual administration of a significantly large number of network end point databases is eliminated. Changes to the network equipment can be forwarded to the new server and the information therein can then be updated.

This invention relates to a method of establishing a call path so that an ICE end-point can obtain information about which STUN, TURN and other servers to use in the ICE procedure. In this method, the client requests information from the ICE_INFO server by sending out a Server_Information_Request message containing the following information: a transaction ID, a client ID, an optional client IP address, an optional peer ID, and a message integrity check. The response from the ICE_INFO server to the client contains the following information: a transaction ID, client server information, optionally peer server information, and message integrity check fields. Client server information includes the identity of the default server of the client, information on the client traversal including a list of servers by type, address, and priority, all for each network along the client traversal, and optionally a list of back-up default servers. Peer server information includes information about the peer traversal, is optional, and includes the identity of the default server for the peer, the information about the peer traversal including a list of servers by type, IP address, and priority, all for each network along the peer traversal, and optionally a list of back-up default servers.

Based on receipt of the client server information from the ICE_INFO server, the client can discover addresses that it can potentially reach procedure dictated by the ICE protocol. The peer server information, if present, can be forwarded either by the new ICE_INFO server or by the client to the peer in call set up. If this information is forwarded to the peer, the peer can use it to discover addresses that it can reach to initiate the call set up. Alternatively, the peer can also request its server information independently from the new ICE_INFO server.

It will be apparent to persons skilled in the art that there are many possible implementations for the new ICE_INFO server. It can be located at one point in the network or distributed at locations hierarchically throughout the network or distributed among many related servers at the same location in the network. The description that follows may describe one or more or these possible realizations, but is not intended to limit the invention to the particularly described realizations for the server or servers in a network. It should also be understood that message formats and encoding are dependent upon the server implementation. A STUN based implementation and a SIP based implementation are primarily described below.

Discovery of ICE_INFO Server

Figure 3:
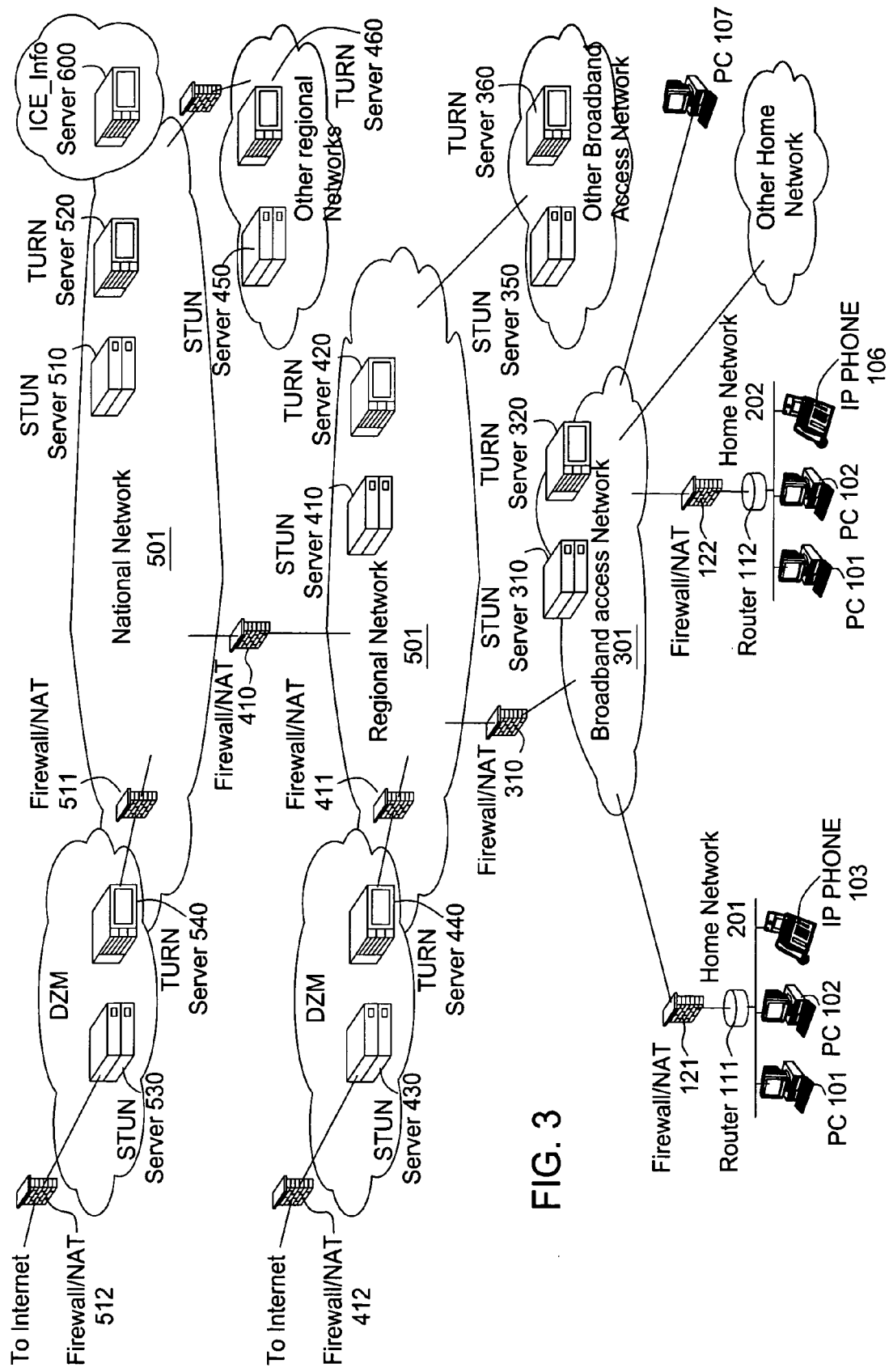
FIG. 3 shows the network from FIG. 2 modified in accordance with the principles of the present invention.

FIG. 3 shows the network depicted in FIG. 2 modified to include at least one ICE_INFO server in accordance with the principles of the present invention. In general, an ICE-INFO client such as PC 104 is configured with a domain name of the ICE-INFO server provider. ICE-INFO service is designated by a service name of "ice". The ICE-INFO client can contact the Domain Name Server (DNS) to locate its ICE-INFO server by referring to the service as "_ice._protocol.domain-name.com". Server address (SRV) procedures specified in RFC 2782 are used to resolve the service reference to an IP/port address. RFC 2782 is hereby incorporated by reference in its entirety. Each domain can support multiple ICE_INFO servers for load balancing and for back-up purposes. Accordingly, a response to an ICE-INFO query can contain more than one SRV record. A default port may also be assigned to this service, although the network administrator may use other port numbers in the SRV. Use of a uniform port number for the ICE_INFO service guarantees passage of ICE-INFO messages through firewalls.

Authentication and Obtaining a Shared Secret

To ensure the integrity of requests and responses, a shared secret between the ICE_INFO client and server is established in anticipation of ICE_INFO requests by the client. A shared secret can be obtained in any well-established way such as Kerberos or the like. In one exemplary embodiment, Shared Secret Request, Shared Secret Response, and Shared Secret Error Response messages of the STUN protocol can be used to establish the shared secret between the client and the server. Advanced Encryption Standard (AES) Cipher Suites for Transport Layer Security (TLS) as specified in RFC 3268 can be used for the shared secret transaction. RFC 3268 is hereby incorporated by reference in its entirety. At the end of the transaction, two temporary parameters are established between the client and the server: a USERNAME that identifies the client uniquely to the server and a password that is the shared secret. These parameters are used in subsequent requests and responses between the client and server to ensure integrity and security of the communications. The parameters are temporary in the sense that they are valid for a relatively short time. Details of the transaction pertaining to the STUN protocol are specified in RFC 3489.

Server Information Request Message

By using a Server_Information_Request message, the ICE_INFO client requests the address of TURN, STUN, and other servers through which the client can then request address allocation or learn its translated addresses. As explained briefly above, the message contains a transaction ID, a client ID, a peer ID optionally, and message integrity check fields. The transaction ID is a field in the message containing an alphanumeric identifier generated by the client to identify and track the message.

Client ID: This field identifies the client. Based on the information in this field, the server determines the sub-network within which this client resides. This field can be configured at a host manually, or through some automated provisioning process, or by other means such as the SIP registration process. For example, a host such as PC 103, in sub-network 201 may be identified as pc_103@sub-network_201.companyA.com. The naming convention followed in this example is that the sub-network is identified by the first component of the x.y.com convention. Other naming conventions are possible.

Client IP address: This is the actual network IP address of the client. It is anticipated that the value of this field may not match the source IP addresses of incoming packets because those packet may traverse one or more NAT devices in reaching the client. Also, the value of this field alone may not be able to uniquely identify the client. Unique identification of a client may not be possible because the client can use a private address.

Peer ID: This is an optional field that, when used, provides gives the identity of the called party, that is, the peer with which the client desires communication. The server determines the sub-network where the peer resides even when that peer is outside the network of interest. By providing this field, the client permits the server to determine a more optimized set of servers in its response. The peer ID can be a public internet address.

Message integrity check fields: These fields provide integrity check for the message. If the Shared Secret procedure of the STUN protocol is used, these fields include the USERNAME and a message digest such as a hashed messaged authentication code (HMAC) as specified in RFC 2104. RFC 2104 is hereby incorporated by reference in its entirety. The shared secret used to compute the message digest is the password in Shared Secret transaction.

ICE_INFO Server Response to Server Information Request Message

The response from the ICE_INFO server to client would contain the transaction ID, a list of servers, the identity of a default server, optionally a list of back up default servers, and message integrity check fields. The server list, also known as a client traversal, is a detailed listing for each identified server including its IP address, its type, and its priority. The list of back up default servers is an optional listing. In general, a back-up server has a lower priority than the default server. A back-up server is contacted by the client when the default server is not reachable or is unavailable such as when all the resources for a default TURN server are full. The back-up default server listing is in priority order and the client is expected to follow that order when contacting the back-up servers.

As an alternative to the single ICE_INFO server and in support of back-up and load balancing functions, each individual ICE_INFO server may be replaced by a group of servers. All servers within the group are of the same type and share the same priority. Only one of the servers within the group should be primarily used. Each server within a group is identified by two additional parameters, namely, preference and weight. A server having the highest preference is expected to be consulted first. Only when that server is unavailable, should other servers in the group be contacted. Servers within a group also have a preference. The weight parameter is used to set the relative frequency with which servers are to be consulted among the subgroup of servers that have the same preference. In the following example, a group includes two servers A and B having the same preference and having different weights. If A has weight 2 and B has weight 1, then the client would consult server A ⅔ of the time and server B ⅓ of the time.

The ICE_INFO server may also respond to a Server_Information_Request, with a Request_Error message, which would contain an error code. This can happen for a variety of reasons. For example, authentication can fail because the USERNAME and the temporary password obtained by the client have expired. It is possible that the client ID is not known as a result of the inability of the ICE_INFO server to determine the location of the client based on the client ID information provided in the original Server_Information_Request message.

As described briefly above, in addition to returning client traversal information, the server can also return peer traversal information. Peer traversal information is the information about peer servers and includes the identity of the default server, a list of servers by type, IP address, and optionally a list of back-up default servers.

Constructing the Response by the ICE_INFO Server

ICE_INFO server 600 contains, or has access to, topological information on hierarchy of the network that it serves including the hierarchy of each sub-network, the naming convention for hosts (servers) in each sub-network, and the IP sub-network address of each sub-network. Preference and weight of each server in a group should also be available to the ICE_INFO server. It is understood that this information can be resident in a topological database available to server 600 and is either manually or automatically administered. An IP address field is optional and, even if present, may not be sufficient to determine the sub-network to which a client belongs. For some networks, an IP address may be sufficient depending upon the IP addressing plan of the network, for example. ICE_INFO server 600 is preferably deployed at the sub-network which is highest in the network hierarchy. This level of sub-network is known as the root sub-network. As depicted in FIG. 3, the root sub-network is national network 501.

Peer-to-peer tunnels can exist between components or networks. These tunnels form "potential" merge points for calls between two network components. They are only potential merge points because the ICE_INFO server of one network component may not have enough detailed information about the network hierarchy of the other network components attached by the tunnel. Clients may want to route traffic through these tunnels, where possible. Therefore, in returning address discovery server information to a client, the ICE_INFO server store and should include information on servers from these potential merge points. The ICE procedure will determine whether a path through a tunnel is possible or not.

Based on this hierarchy, priority is assigned to TURN servers, STUN servers, and other servers in the sub-networks. In general, for servers of the same type, a server closer the root sub-network has a lower priority than one that is farther away. Also, all STUN servers have a higher priority than all TURN servers at the same network level in the hierarchy. Relationship between the STUN and TURN servers with other servers would depend on the behavior of the other servers.

When ICE_INFO server 600 receives a Server_Information_Request message from a client, it executes the following process beginning at the block labeled "START" depicted in FIGS. 4-7, inclusive.

After the process starts, control is transferred to block 110. In block 110, the server first checks the message_integrity_check field to determine whether there has been any tampering with the message. If there has been tampering with the message, the process returns a failure and turns control to block 111. In block 111, the server discards the message and turns control to block 112 wherein the server generates a request_response_error message to the client including the appropriate error code. If no tampering has been detected, control is turned over to block 120 in the process.

In block 120, the server uses the information in client_ID field of the Server_Information_Request message and the optional IP address field to determine whether the client is in the network served by the server. If the client is not in the network served by ICE_INFO server 600, the server turns control over to block 111 wherein the message is discarded. Following message disposal, the server generates a request_response_error message in block 112 with the appropriate error code back to the client. If the client is in the network, control is turned over to block 130.

In block 130, server 600 checks the peer_ID, if provided, to determine the sub-network to which the peer belongs. If the peer_ID is present, control is turned over to block 170. Otherwise, control is turned over to process A in FIG. 5. In an alternative embodiment, the peer_ID field can be a mandatory field in the Server_Information_Request message. A detected empty Peer_ID field would cause the server to generate an error, instead of assuming that the call is on-net.

Figure 5:
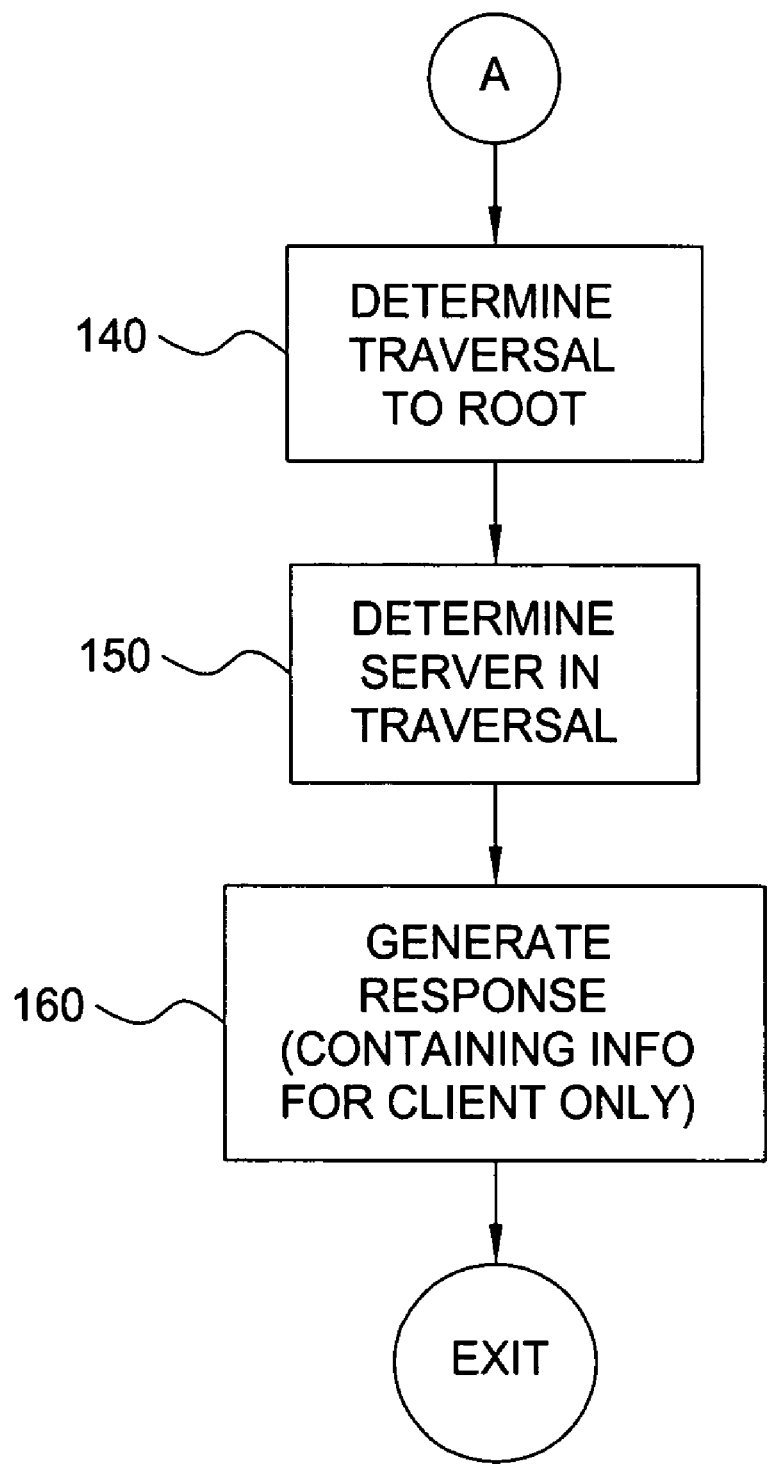

In process A in FIG. 5, the peer_ID is recognized as being absent and control is turned over to block 140 to begin developing the traversal from the client to the root network. Generally, when the peer_ID field is absent, server 600 assumes that the client is making an on-net call to the peer. Server 600 identifies the traversal, that is, shortest path from the client to the root sub-network, excluding the sub-network in which the client is connected. In block 150, server 600 encodes the client_server_information field to include the address, type, and priority information for each server (e.g., both STUN and TURN) of each type in each sub-network in the traversal. Control is then transferred to block 160. In block 160, server 600 sends a response to the client and the client traversal and process A terminates.

Figure 4:
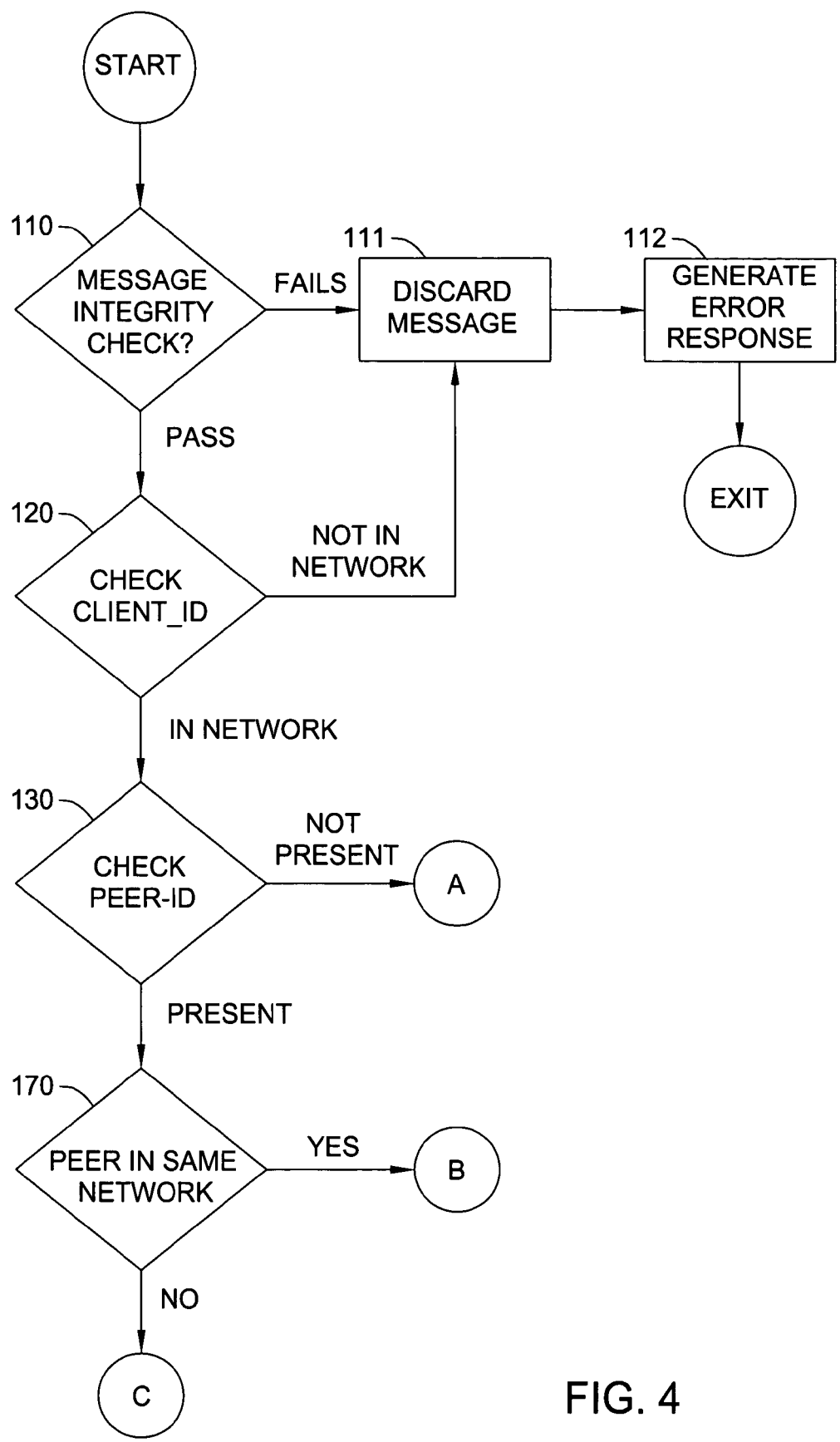
FIGS. 4-7 depict a process performed by the ICE_INFO server in response to the request message.

In the process in FIG. 4, if the peer_ID is present, process control is transferred to block 170. In block 170, server 600 determines whether the peer is on-net or off-net, consulting an external database if necessary. If the peer is in the same network as the server, the process control is transferred to process B depicted in FIG. 6. If the peer is outside the server's network, the process control is transferred to process C depicted in FIG. 7.

Figure 6:
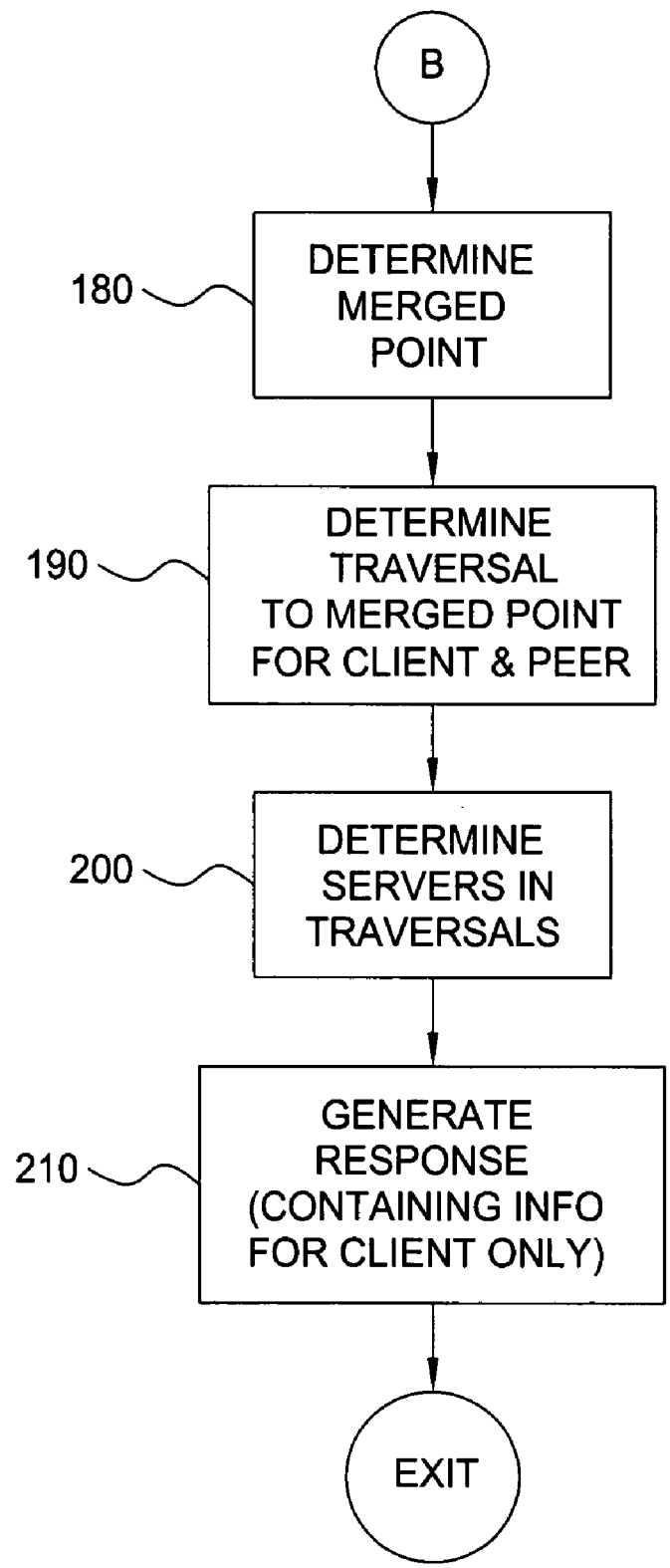

In block 180 of FIG. 6, server 600 begins by determining the merge point of the client and the peer traversals as defined above. Server 600 then determines the shortest call path between the client and the merge point and between the peer and the merge point in block 190. In block 200, the server encodes the client_server_information field to include a server of each type (e.g., STUN and TURN) for each sub-network traversed between the client and the merge point. The same task is repeated by the server for the peer and the result is encoded in the peer_server_information field. In block 210, server 600 generates and sends a response to the client and the peer containing the results from the previous two blocks and process B terminates. In an alternative embodiment of the process, server 600 sends all the information back to the client, who then forwards the peer_server_information field over to the peer.

Figure 7:
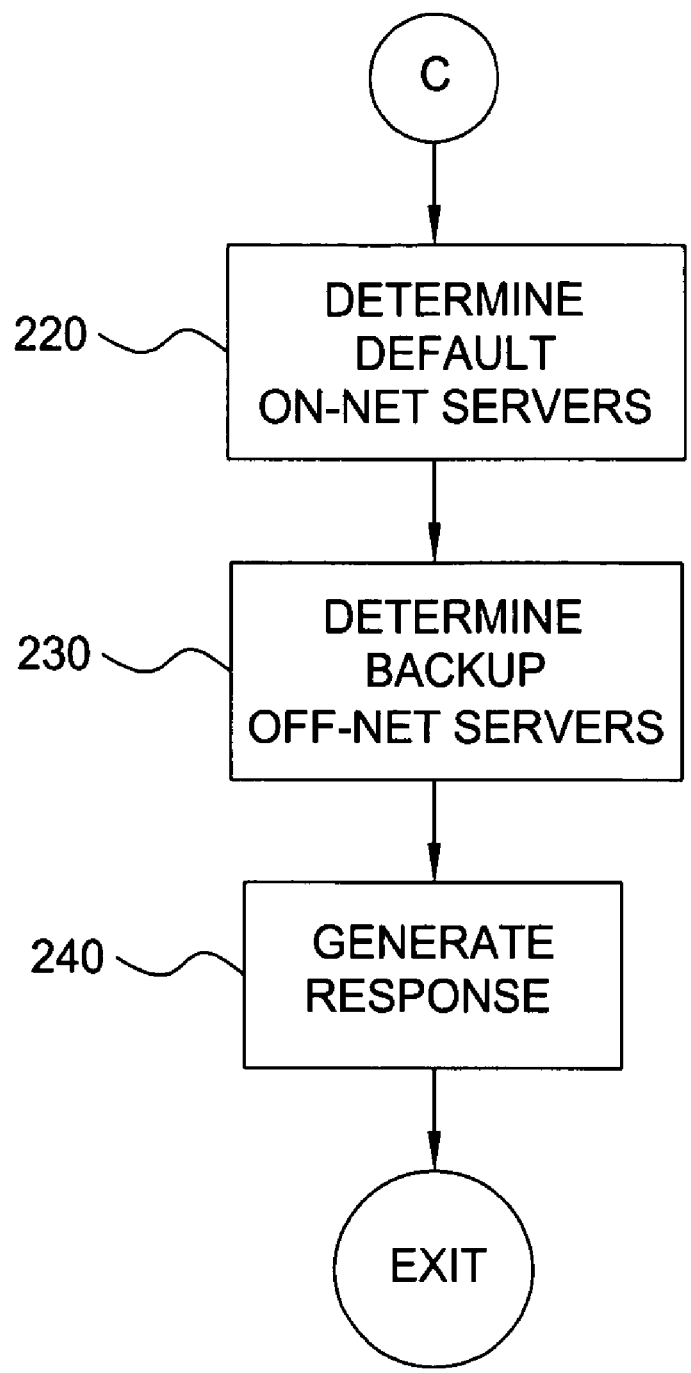

For an off-net call identified in block 170, server 600 begins process C outlined in FIG. 7 to determine the optimum set of off-net servers to use as default servers. In the network shown in FIG. 3, for example, when PC 101 is making an off-net call, one possible preferred off-net set of servers for this call may be STUN server 430 and TURN server 440 because they are closest to PC 101. In block 230, server 600 determines the identity of back up default servers. For the example mentioned above, STUN server 530 and TURN server 540 can serve as back up default servers. In block 240, server 600 generates and sends a response back to the client containing information about the identity of the backup default servers and process C terminates.

Client and Peer Behavior

In the simplest implementation before call path set up, the client sends a request to its ICE_INFO server with the peer_ID field empty. The ICE_INFO server performs its operations as described above and responds to the client. After receiving the response from the ICE_INFO server, the client then initiates call set up following the standard ICE protocol. Upon the receipt of the call set up message (e.g., the INVITE message for SIP), the peer sends a request to its ICE_INFO server. Upon receipt of the response from the peer's ICE_INFO server, the peer proceeds with data provided by the server and follows the ICE procedures. During this time, call set up may proceed using the default address similar to the normal ICE procedure. This is referred to as the simple case.

A variation from the simple case occurs when a client sends a request to its ICE_INFO server and provides the peer_ID. The response would provide information for the client and the peer. The client can forward the peer related information to the peer through the signaling message. In this way, the client communication to the peer would save the need for the peer to consult independently its ICE_INFO server. Also, the ICE_INFO can determine and forward merge points thereby allowing the client and peer to optimize the call path at a very early stage without going through a trial and error procedure as dictated by the ICE protocol.

An enhancement to the procedure described above is that the peer sends the request to its ICE_INFO server anyway and compares whether the merge point provided by the client request is the same as or different from the merge point provided in its own peer request. If the merge point is the same, then the call set up proceeds as expected with the peer and client contacting the server at the merge point server. If the merge points do not match, there is an error in the stored network topology information and the peer can then terminate the call set up with the appropriate error code. In response to the termination by the peer, the originator client then sends another request to the ICE_INFO server for traversal information. The request eliminates peer information from the peer_ID field. In response to the information from the server, the client then proceeds as in the simple case above. This provides for the more robustness in the protocol.

In yet another alternative embodiment, the ICE_INFO server, in responding to a request, can always return information on servers located on the full traversal, all the way up to the root sub-network. The response can also clearly identify the merge point. The peer_server_information is forwarded to the peer. In the first call set up attempt, the server with the lowest priority at the merge point is used as the default server for address discovery. The peer also contacts its ICE_INFO server. If the merge point matches, the call set up proceeds normally. But if the merge point does not match the merge point returned by the peer's request, the call set up is terminated. Upon termination, the originating client automatically and immediately begins a second call set up attempt. The second call set up uses the server with the lowest priority at the root sub-network as the default server for address discovery and set up proceeds as described for the simple case.

This invention relies on a client-server architecture so an ICE client end point can acquire server information to establish a call path by initiating the ICE protocol. Clients and servers are logical modules that can be implemented in a number of ways. Client modules are provisioned in the endpoints. Server modules can be provisioned as separate independent entities or as part of an existing platform such as a SIP proxy server.

Messages that initiate the call set up process can be encoded in many ways. In one embodiment, the messages are encoded using the same structure as specified in the STUN specification. As described above, the same Shared Secret Request message and response structure used in the STUN protocol can be used herein. This embodiment is well suited in the scenario where the server is implemented as a separate entity. Another embodiment for the message structure is to utilize the invention as an extension to SIP. The server_info_request message can be encoded as an object of the SIP INFO method such as a SIP request message. The response to this request is encoded as another object in the responses. The existing security infra-structure in SIP can be used to support the message integrity check described above. This method is well suited where the server is implemented in a SIP proxy server. The Server_Infomation_Request message and its response can also be encapsulated similarly for other signaling protocols or encoded in some other methods.

Figure 8:
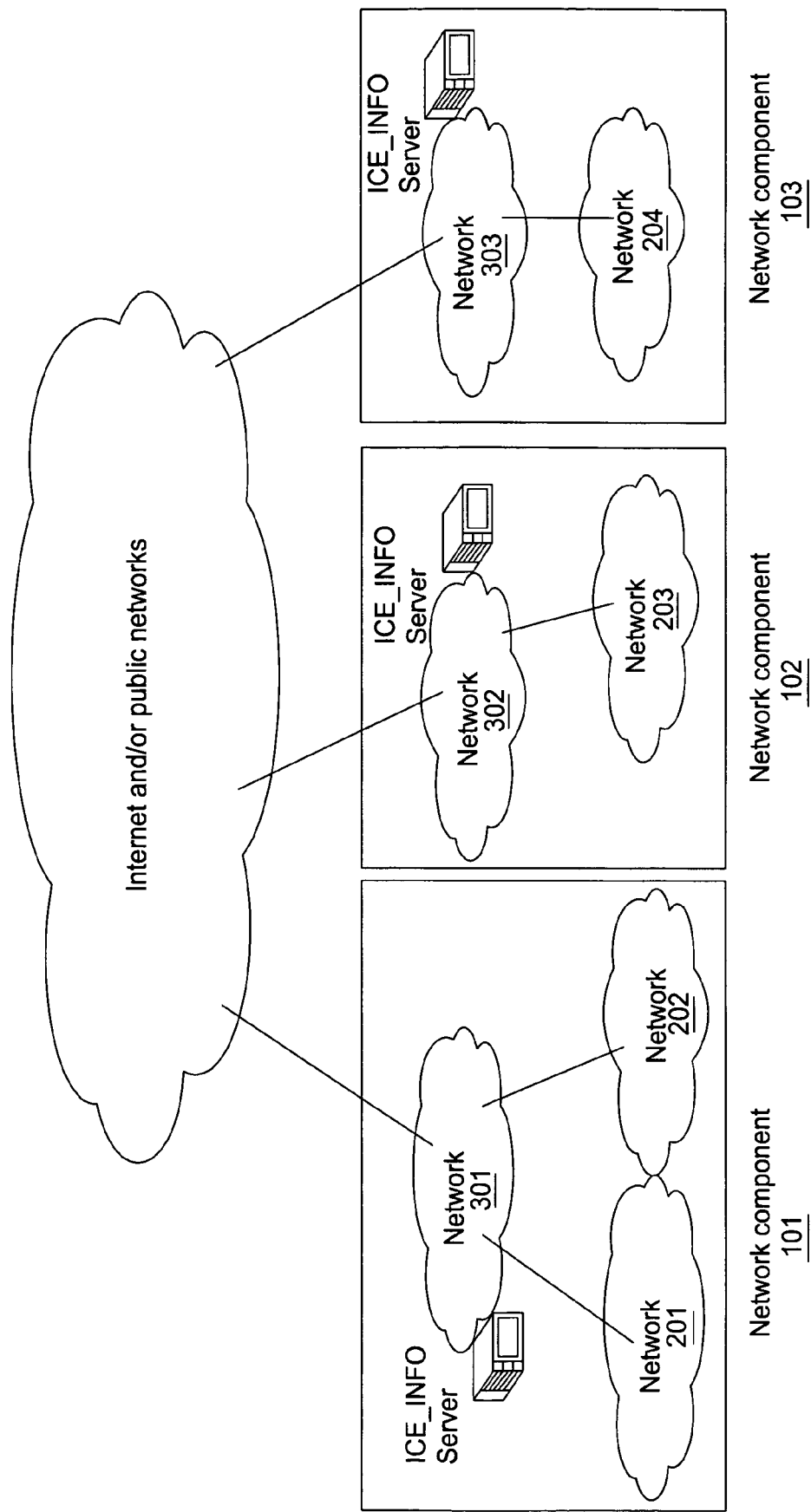
FIG. 8 shows a simplified diagram of a network in which the sub-networks or network components including their related ICE_INFO servers are all connected to the Internet or other public networks.

The present invention has been described in an example where the network has only a single component. In practice, however, a network may have multiple components connected by the Internet or some other public networks offered by services providers as illustrated in FIG. 8. As depicted in FIG. 8, each network component is treated as a network by itself and has its own ICE_INFO server. The ICE_INFO server maintains information for the network-component that it serves. Calls between network-components are treated as off-net calls.

If the ICE_INFO database is always accurate and up to date and has complete information on the network, the server can just return information on the STUN and TURN server at the merge point. This serves to simplify the ICE procedure and reduces utilization of network resources. If some connectivity information is missing from the database because it is not accurate or current, then information between the client and the merge point will be needed because a potential shortcut is not in the database.

The nature of the NAT devices between the networks could also be stored in the database as link information between the networks. This link information can define the type of NAT device that exists by using the conventions of full cone, restricted cone, symmetric, and the like as described above. If such information is stored in the network topology database, more efficient filtering can be achieved. For example, if the cumulative set of NAT devices between the client and the merge point is a symmetric NAT, then provision of the STUN server information can be omitted because the call path will always be over the TURN server in order to have the UDP packets traverse the symmetric NAT. If the cumulative set of NAT devices is a full cone, then the STUN server information should definitely be included in the traversal because the address learned through the STUN server provides the most efficient call path through the network in terms of network resources. For other NAT types, STUN server information may or may not be included in the traversal depending on the nature of the equipment for the client and its peer. In all instances, the TURN server must be returned as the default server.

While the foregoing is directed to embodiments of the present invention, other and further embodiments of the invention may be devised without departing from the basic scope thereof, and the scope thereof is determined by the claims that follow.

The invention claimed is:

1. A method for establishing a call path between a calling party and a called party in a data network, the method comprising the steps of:
   receiving by a network information server a request from the calling party, said request identifying at least the calling party;
   responsive to said request, determining a first network traversal based on stored topology information for said data network;
   sending the first traversal to the calling party, wherein the first traversal includes call path information between the calling party and a root network;
   determining a merge point in the network related to an intersection of the first traversal and a second network traversal; and
   sending the merge point to a called and calling parties wherein said merge point includes information identifying a Simple Traversal of UDP through Network Address Translation Devices (STUN) server and a Traversal Using Relay NAT (TURN) server collocated at the merge point.

2. The method as defined in claim 1 further including the steps of:
   receiving a request from the called party, said request identifying at least the called party;
   responsive to said request, determining the second network traversal based on the topology information; and
   sending the second traversal to the called party wherein the second traversal includes call path information between the called party and the root network.

3. The method as defined in claim 1, wherein said merge point includes information identifying a TURN server located at the merge point.

4. The method as defined in claim 1 wherein said request also identifies at least the called party, the method further including the steps of:
   responsive to said request, determining a second network traversal based on the topology information; and
   sending the first and second traversals to the calling party wherein the second traversal includes call path information between the called party and the root network.

5. The method as defined in claim 4 further including the steps of:
   determining a merge point in the network related to an intersection of the first and second traversals; and
   sending the merge point to the calling party.

6. The method as defined in claim 5 wherein said merge point includes information identifying a Simple Traversal of UDP through Network Address Translation Devices (STUN) server and a Traversal Using Relay NAT (TURN) server collocated at the merge point.

7. The method as defined in claim 5 wherein said merge point includes information identifying a TURN server located at the merge point.

8. The method as defined in claim 1 wherein said request also identifies at least the called party, the method further including the steps of:
   responsive to said request, determining a second network traversal based on the topology information; and
   sending the first traversal to the calling party and sending the second traversal to the called party wherein the second traversal includes call path information between the called party and the root network.

9. The method as defined in claim 8 further including the steps of:
   determining a merge point in the network related to an intersection of the first and second traversals; and
   sending the merge point to both the calling party and the called party.

10. The method as defined in claim 9 wherein said merge point includes information identifying a Simple Traversal of UDP through Network Address Translation Devices (STUN) server and a Traversal Using Relay NAT (TURN) server collocated at the merge point.

11. The method as defined in claim 9 wherein said merge point includes information identifying a TURIN server located at the merge point.

12. A method for establishing a call path between a calling party and a called party in a data network, the method comprising the steps of:
    receiving by a network information server a request from the calling party, said request identifying at least the calling party and the called party;
    responsive to said request, determining a merge point based on stored topology information for said data network and identification of the calling and called parties; and
    sending the merge point to the calling party, the merge point being located on an optimally short call path in the network between the calling party and the called party wherein said merge point includes information identifying a Simple Traversal of UDP through Network Address Translation Devices (STUN) server and a Traversal Using Relay NAT (TURN) server collocated at the merge point.

13. The method as defined in claim 12 further including the step of sending the merge point to the called party.

14. The method as defined in claim 13 wherein said merge point includes information identifying a TURIN server located at the merge point.

15. A method for establishing a call path between a calling party and a called party in a data network, the method comprising the steps of:
    transmitting a request to a network information server for establishment of a call path through the network, said request identifying at least the calling party;
    receiving from said network information server a first traversal, wherein the first traversal includes call path information between the called party and a root network; and
    contacting a call server identified in the first traversal to establish the call path wherein the call server is located at a merge point, said merge point includes information identifying a Simple Traversal of UDP through Network Address Translation Devices (STUN) server and a Traversal Using Relay NAT (TURN) server collocated at the merge point.

16. The method as defined in claim 15 wherein said request also identifies at least the called party, the method further including the steps of:
    receiving from said network information server a second network traversal based on a topology of the data network; and
    transmitting the second traversal to the called party wherein the second traversal includes call path information between the called party and the root network.

17. The method as defined in claim 16 further including the steps of:
    receiving from said network information server a merge point related to an intersection of said first and second traversals; and sending the merge point to the calling party.

18. The method as defined in claim 15, wherein said merge point includes information identifying a TURN server located at the merge point.

19. The method as defined in claim 15 wherein, when establishment of said call path fails between the calling and called parties through said call server, the method includes the step of contacting a call server identified in the first traversal at the root network to establish the call path using the ICE procedure.

20. A method for establishing a call path between a calling party and a called party in a data network, the method comprising the steps of:

transmitting a request to a network information server for establishment of a call path through the network, said request identifying at least the calling party and the called party;

receiving from said network information server a merge point based on topology information for said data network and identification of the calling and called parties and being related to an optimally short call path in the network between the calling party and the called party; and contacting a call server identified at the merge point to establish the call path wherein said merge point includes information identifying a Simple Traversal of UDP through Network Address Translation Devices (STUN) server and a Traversal Using Relay NAT (TURN) server collocated at the merge point.

21. The method as defined in claim 20 further including the step of sending the merge point to the called party.

22. The method as defined in claim 20 wherein said merge point includes information identifying a TURN server located at the merge point.

* * * * *

UNITED STATES PATENT AND TRADEMARK OFFICE
CERTIFICATE OF CORRECTION

PATENT NO. : 7,620,033 B2  Page 1 of 1
APPLICATION NO. : 10/850977
DATED : November 17, 2009
INVENTOR(S) : Chu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1580 days.

Signed and Sealed this

Fourteenth Day of December, 2010

David J. Kappos
*Director of the United States Patent and Trademark Office*